United States Patent
Wang et al.

(10) Patent No.: US 11,844,069 B2
(45) Date of Patent: Dec. 12, 2023

(54) METHOD FOR TRANSMITTING PUSCH AND USER EQUIPMENT

(71) Applicant: FG Innovation Company Limited, New Territories (HK)

(72) Inventors: Hai-Han Wang, Taipei (TW); Chia-Hao Yu, Taipei (TW)

(73) Assignee: FG Innovation Company Limited, New Territories (HK)

( * ) Notice: Subject to any disclaimer, the term of this patent is extended or adjusted under 35 U.S.C. 154(b) by 212 days.

(21) Appl. No.: 17/575,636

(22) Filed: Jan. 14, 2022

(65) Prior Publication Data

US 2022/0240281 A1    Jul. 28, 2022

Related U.S. Application Data (60) Provisional application No. 63/138,149, filed on Jan. 15, 2021.

(51) Int. Cl.
  *H04W 72/1268* (2023.01)
  *H04W 52/14* (2009.01)
  *H04W 72/12* (2023.01)
  *H04W 72/0446* (2023.01)

(52) U.S. Cl.
  CPC ..... *H04W 72/1268* (2013.01); *H04W 52/146* (2013.01); *H04W 72/12* (2013.01); *H04W 72/0446* (2013.01)

(58) Field of Classification Search
  None
  See application file for complete search history.

(56) References Cited

U.S. PATENT DOCUMENTS

| | | | | |
|---|---|---|---|---|
| 2022/0217653 | A1* | 7/2022 | Kung | H04L 5/0048 |
| 2023/0180147 | A1* | 6/2023 | Kowalski | H04W 52/46 |
| | | | | 455/522 |
| 2023/0309022 | A1* | 9/2023 | Ling | H04W 52/242 |
| | | | | 455/522 |

FOREIGN PATENT DOCUMENTS

EP  3609097 A1 *  2/2020  ........... H04B 17/309

OTHER PUBLICATIONS

3GPP, "Technical Specification, 3rd Generation Partnership Project; Technical Specification Group Radio Access Network; NR; Physical layer procedures for control (Release 16)," 3GPP TS 38.213 V16.2.0, Jun. 2020, pp. 1-176.

(Continued)

*Primary Examiner* — Alex Skripnikov
(74) *Attorney, Agent, or Firm* — JCIPRNET (57) ABSTRACT

A method for transmitting physical uplink shared channel (PUSCH) and a user equipment (UE) are provided. In the method, a configuration of a first PUSCH with a number of PUSCH repetitions is received. Physical Downlink Control Channel (PDCCH) which includes a Transmit Power Control (TPC) command is received. Whether the PDCCH is received within a number of symbols before a first symbol of a slot bundle is determined. In response to determining the PDCCH is received within the number of symbols before the first symbol of the slot bundle, the TPC command is applied for a first PUSCH transmission occasion within the slot bundle. In response to determining the PDCCH is not received within the number of symbols before the first symbol of the slot bundle, the TPC command is applied for a second PUSCH transmission occasion within a second slot bundle after the slot bundle.

12 Claims, 3 Drawing Sheets

(56) References Cited

OTHER PUBLICATIONS

3GPP, "Technical Specification, 3rd Generation Partnership Project; Technical Specification Group Radio Access Network; NR; Physical layer procedures for data (Release 16)," 3GPP Ts 38.214 V16.2.0, Jun. 2020, pp. 1-163.

3GPP, "Technical Specification, 3rd Generation Partnership Project; Technical Specification Group Radio Access Network; NR; Physical channels and modulation (Release 16)," 3GPP Ts 38.211 V16.2.0, Jun. 2020, pp. 1-131.

3GPP, "Technical Specification, 3rd Generation Partnership Project; Technical Specification Group Radio Access Network; NR; User Equipment (UE) radio transmission and reception; Part 1: Range 1 Standalone (Release 16)," 3GPP TS 38.101-1 V16.4.0, Jun. 2020, pp. 1-406.

3GPP, "Technical Specification, 3rd Generation Partnership Project; Technical Specification Group Radio Access Network; NR; User Equipment (UE) radio transmission and reception; Part 2: Range 2 Standalone (Release 16)," 3GPP TS 38.101-2 V16.4.0, Jun. 2020, pp. 1-172.

3GPP, "Technical Specification, 3rd Generation Partnership Project; Technical Specification Group Radio Access Network; NR; User Equipment (UE) radio transmission and reception; Part 3: Range 1 and Range 2 Interworking operation with other radios (Release 16)," 3GPP TS 38.101-3 V16.4.0, Jun. 2020, pp. 1-492.

3GPP, "Technical Specification, 3rd Generation Partnership Project; Technical Specification Group Radio Access Network; NR; Multiplexing and channel coding (Release 16)," 3GPP TS 38.212 V16.2.0, Jun. 2020, pp. 1-151.

3GPP, "Technical Specification, 3rd Generation Partnership Project; Technical Specification Group Radio Access Network; NR; Requirements for support of radio resource management (Release 16)," 3GPP TS 38.133 V16.4.0, Jun. 2020, pp. 1-1463.

* cited by examiner

METHOD FOR TRANSMITTING PUSCH AND USER EQUIPMENT

CROSS-REFERENCE TO RELATED APPLICATION(S)

The present application claims the benefit of and priority to U.S. Provisional Patent Application Ser. No. 63/138,149, filed on Jan. 15, 2021, entitled "PROCESSING OF MULTI-SLOT UL TRANSMISSIONS", the content of which is hereby incorporated fully by reference herein into the present disclosure.

FIELD

The present disclosure generally relates to wireless communications, and more particularly, to a method for transmitting physical uplink shared channel (PUSCH) and a user equipment (UE).

BACKGROUND

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

However, it is identified that some IoT use cases such as wearable, wireless sensor network, and video surveillance which have requirements of lower reliability and longer latency compared to URLLC and lower data rate requirement compared to eMBB. UEs with reduced capabilities (RedCap UEs) compared to normal UEs in release-15 (Rel-15) and Rel-16 may be used for the use cases. The RedCap UEs with reduced complexity features such as reduced number of receive (RX) or smaller antenna size may have worse coverage than normal UEs. Hence, coverage recovery may be needed for RedCap UEs since RedCap UEs are very likely to be deployed in the same network as normal UEs and network deployment is very likely to be deployed based on the coverage of normal UEs. Furthermore, compared to long term evolution (LTE), NR is designed to operate at much higher frequencies such as 28 GHz or 39 GHz in frequency range 2 (FR2). Due to the higher frequencies, it is inevitable that the wireless channel will be subject to higher path-loss making it more challenging to maintain an adequate quality of service that is at least equal to that of legacy radio access technologies (RATs) such as LTE. To provide ubiquitous coverage for a typical subscriber using mobile application of particular importance such as voice service, coverage enhancements may be needed for some physical channels, which is the coverage bottleneck in typical deployment scenarios.

SUMMARY

The present disclosure is directed to a method for transmitting PUSCH and a UE.

According to one or more exemplary embodiments of the disclosure, a method for transmitting Physical Uplink Shared Channel (PUSCH) and adapted for a UE is provided. The method includes, but is not limited to, the following steps. A configuration of a first PUSCH with a number of PUSCH repetitions is received. Physical Downlink Control Channel (PDCCH) which includes a Transmit Power Control (TPC) command is received. Whether the PDCCH is received within a number of symbols before a first symbol of a slot bundle is determined. The first symbol is an initial symbol in the slot bundle, and the slot bundle includes multiple time slots used for transmitting the first PUSCH with the number of the PUSCH repetitions. In response to determining the PDCCH is received within the number of symbols before the first symbol of the slot bundle, the TPC command is applied for a first PUSCH transmission occasion. In response to determining the PDCCH is not received within the number of symbols before the first symbol of the slot bundle, the TPC command is applied for a second PUSCH transmission occasion. The first PUSCH transmission occasion is within the slot bundle. The second PUSCH transmission occasion is within a second slot bundle after the slot bundle.

According to one or more exemplary embodiments of the disclosure, UE is provided. The UE includes, but is not limited to, a transceiver, a memory, and a processor. The transceiver is used for transmitting to receiving signals. The memory is used for storing a program code. The processor is coupled to the transceiver and the memory. The processor is configured to load and execute the program code to perform the following steps. A configuration of a first PUSCH with a number of PUSCH repetitions is received through the transceiver. PDCCH which includes a TPC command is received through the transceiver. Whether the PDCCH is received within a number of symbols before a first symbol of a slot bundle is determined. The first symbol is an initial symbol in the slot bundle, and the slot bundle includes multiple time slots used for transmitting the first PUSCH with the number of the PUSCH repetitions. In response to determining the PDCCH is received within the number of symbols before the first symbol of the slot bundle, the TPC command is applied for a first PUSCH transmission occasion. In response to determining the PDCCH is not received within the number of symbols before the first symbol of the slot bundle, the TPC command is applied for a second PUSCH transmission occasion. The first PUSCH transmission occasion is within the slot bundle. The second PUSCH transmission occasion is within a second slot bundle after the slot bundle.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

The acronyms in the present disclosure are defined as follows and unless otherwise specified, the acronyms have the following meanings:

| Acronym | Full name |
|---|---|
| 3GPP | 3rd Generation Partnership Project |
| 5GC | 5G Core |
| ACK | Acknowledgement |
| ARQ | Automatic Repeat Request |
| BS | Base Station |
| BWP | Bandwidth Part |
| CA | Carrier Aggregation |
| CBRA | Contention-based Random Access |
| CG | Configured Grant |
| CN | Core Network |
| CORESET | Control Resource Set |
| CP | Cyclic Prefix |
| C-RNTI | Cell-Radio Network Temporary Identifier |
| CSI | Channel State Information |
| DC | Dual Connectivity |
| DCI | Downlink Control Information |
| DG | Dynamic Grant |
| DM-RS | DeModulation Reference Signal |
| DL | Downlink |
| eMBB | Enhanced Mobile Broadband |
| HARQ | Hybrid Automatic Repeat Request |
| IE | Information Element |
| LDPC | Low-Density Parity-Check |
| MAC | Medium Access Control |
| MCG | Master Cell Group |
| MIMO | Multiple Input Multiple Output |
| mMTC | Massive Machine Type Communication |
| MN | Master Node |
| NG-RAN | Next-Generation Radio Access Network |
| NR | New Radio |
| NW | Network |
| OFDM | Orthogonal Frequency-Division Multiplexing |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical Layer |
| PSCell | Primary SCG Cell |
| PRACH | Physical Random Access Channel |
| PRB | Physical Resource Block |
| PUCCH | Physical Uplink Control Channel |
| PUSCH | Physical Uplink Shared Channel |
| RA | Random Access |
| RACH | Random Access Channel |
| RAN | Radio Access Network |
| RE | Resource Element |
| Rel | Release |
| RLC | Radio Link Control |
| RNTI | Radio Network Temporary Identifier |
| RRC | Radio Resource Control |
| RV | Redundancy Version |
| SCell | Secondary Cell |
| SCG | Secondary Cell Group |
| SCS | Sub Carrier Spacing |
| SDAP | Service Data Adaptation Protocol |
| SDU | Service Data Unit |
| SFI | Slot Format Indicator |
| SFN | System Frame Number |
| SI | System Information |
| SN | Secondary Node |
| SpCell | Special Cell |
| SRS | Sounding Reference Signal |
| SSB | Synchronization Signal Block |
| TBS | Transport Block Size |
| TDD | Time-Division Duplex |
| TPC | Transmit Power Control |
| TS | Technical Specification |
| UCI | Uplink Control Information |
| UE | User Equipment |
| UL | Uplink |
| URLLC | Ultra-Reliable and Low-Latency Communication |
| V2X | Vehicle to Everything |

Some terms would be introduced first.

HARQ-ACK: HARQ is a scheme that combines the ARQ (Automatic Repeat reQuest) error control mechanism and FEC (Forward Error Correction) coding in which unsuccessful attempts are used in FEC decoding instead of being discarded. HARQ-ACK feedback is used to indicate whether a HARQ process is successfully received.

UCI Multiplexing Timeline:

If a UE would transmit multiple overlapping PUCCHs in a slot or overlapping PUCCH(s) and PUSCH(s) in a slot and, when applicable as described in Subclauses 9.2.5.1 and 9.2.5.2 of 3GPP TS 38.213, the UE is configured to multiplex different UCI types in one PUCCH, and at least one of the multiple overlapping PUCCHs or PUSCHs is in response to a DCI format detection by the UE, the UE multiplexes all corresponding UCI types if the following conditions are met. If one of the PUCCH transmissions or PUSCH transmissions is in response to a DCI format detection by the UE, the UE expects that the first symbol $S_0$ of the earliest PUCCH or PUSCH, among a group overlapping PUCCHs and PUSCHs in the slot, satisfies the following timeline conditions.

$S_0$ is not before a symbol with CP starting after $T_{proc,1}^{mux}$ after a last symbol of any corresponding PDSCH, $T_{proc,1}^{mux}$ is given by maximum of $\{T_{proc,1}^{mux,1}, \ldots, T_{proc,1}^{mux,i}, \ldots\}$ where for the i-th PDSCH with corresponding HARQ-ACK transmission on a PUCCH which is in the group of overlapping PUCCHs and PUSCHs, $T_{proc,1}^{mux,i} = (N_1 + d_{1,1} + 1) \cdot (2048 + 144) \cdot \kappa \cdot 2^{-\mu} \cdot T_C$, $d_{1,1}$ is selected for the i-th PDSCH following [6, 3GPP TS 38.214], $N_1$ is selected based on the UE PDSCH processing capability of the i-th PDSCH and SCS configuration $\mu$, where $\mu$ corresponds to the smallest SCS configuration among the SCS configurations used for the PDCCH scheduling the i-th PDSCH (if any), the i-th PDSCH, the PUCCH with corresponding HARQ-ACK transmission for i-th PDSCH, and all PUSCHs in the group of overlapping PUCCHs and PUSCHs.

$S_0$ is not before a symbol with CP starting after $T_{proc,release}^{mux}$ after a last symbol of any corresponding SPS PDSCH release. $T_{proc,release}^{mux}$ is given by maximum of $\{T_{proc,release}^{mux,1}, \ldots, T_{proc,release}^{mux,i}, \ldots\}$ where for the i-th PDCCH providing the SPS PDSCH release with corresponding HARQ-ACK transmission on a PUCCH which is in the group of overlapping PUCCHs and PUSCHs, $T_{proc,release}^{mux,i} = (N+1) \cdot (2048 + 144) \cdot \kappa \cdot 2^{-\mu} \cdot T_C$, N is described in Subclause 10.2 and is selected based on the UE PDSCH processing capability of the i-th SPS PDSCH release and SCS configuration $\mu$, where $\mu$ corresponds to the smallest SCS configuration among the SCS configurations used for the PDCCH providing the i-th SPS PDSCH release, the PUCCH with corresponding HARQ-ACK transmission for i-th SPS PDSCH release, and all PUSCHs in the group of overlapping PUCCHs and PUSCHs.

If there is no aperiodic CSI report multiplexed in a PUSCH in the group of overlapping PUCCHs and PUSCHs, $S_0$ is not before a symbol with CP starting after $T_{proc,2}^{mux}$ after a last symbol of any PDCCH with the DCI format scheduling an overlapping PUSCH, and any PDCCH scheduling a PDSCH or SPS PDSCH release with corresponding HARQ-ACK information in an overlapping PUCCH in the slot.

If there is at least one PUSCH in the group of overlapping PUCCHs and PUSCHs, $T_{proc,2}^{mux}$ given by maximum of $\{T_{proc,2}^{mux,1}, \ldots, T_{proc,2}^{mux,i}, \ldots\}$ where for the i-th PUSCH which is in the group of overlapping PUCCHs and PUSCHs, $T_{proc,2}^{mux,i}=\max\ ((N_2+d_{2,1}+1)\cdot(2048+144)\cdot\kappa\cdot 2^{-\mu}\cdot T_C, d_{2,2})$, $d_{2,1}$ and $d_{2,2}$ are selected for the i-th PUSCH following [6, 3GPP TS 38.214], $N_2$ is selected based on the UE PUSCH processing capability of the i-th PUSCH and SCS configuration μ, where μ corresponds to the smallest SCS configuration among the SCS configurations used for the PDCCH scheduling the i-th PUSCH (if any), the PDCCHs scheduling the PDSCHs with corresponding HARQ-ACK transmission on a PUCCH which is in the group of overlapping PUCCHs/PUSCHs, and all PUSCHs in the group of overlapping PUCCHs and PUSCHs.

If there is no PUSCH in the group of overlapping PUCCHs and PUSCHs, $T_{proc,2}^{mux}$ is given by maximum of $\{T_{proc,2}^{mux,1}, \ldots, T_{proc,2}^{mux,i}, \ldots\}$ where for the i-th PDSCH with corresponding HARQ-ACK transmission on a PUCCH which is in the group of overlapping PUCCHs, $T_{proc,2}^{mux,i}=(N_2+1)\ (2048+144)\cdot K\cdot 2^{-\mu}\cdot T_C$, $N_2$ is selected based on the UE PUSCH processing capability of the PUCCH serving cell if configured. $N_2$ is selected based on the UE PUSCH processing capability 1, if PUSCH processing capability is not configured for the PUCCH serving cell. μ is selected based on the smallest SCS configuration between the SCS configuration used for the PDCCH scheduling the i-th PDSCH (if any) with corresponding HARQ-ACK transmission on a PUCCH which is in the group of overlapping PUCCHs, and the SCS configuration for the PUCCH serving cell.

If there is an aperiodic CSI report multiplexed in a PUSCH in the group of overlapping PUCCHs and PUSCHs, $S_0$ is not before a symbol with CP starting after $T_{proc,CSI}^{mux}=\max((Z+d)\cdot(2048+144)\cdot\kappa\cdot 2^{-\mu}\cdot T_C, d_{2,2})$ after a last symbol of any PDCCH with the DCI format scheduling an overlapping PUSCH, and any PDCCH scheduling a PDSCH or SPS PDSCH release with corresponding HARQ-ACK information in an overlapping PUCCH in the slot μ corresponds to the smallest SCS configuration among the SCS configuration of the PDCCHs, the smallest SCS configuration for the group of the overlapping PUSCHs, and the smallest SCS configuration of CSI-RS associated with the DCI format scheduling the PUSCH with the multiplexed aperiodic CSI report, and d=2 for μ=0,1, d=3 for μ=2 and d=4 for μ=3 $N_1$, $N_2$ $d_{1,1}$, $d_{2,1}$, $d_{2,2}$, and Z are defined in [6, 3GPP TS 38.214], and κ and $T_C$ are defined in [4, 3GPP TS 38.211].

The following description contains specific information pertaining to example embodiments in the present disclosure. The drawings in the present disclosure and their accompanying detailed description are directed to merely example embodiments. However, the present disclosure is not limited to merely these example embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different embodiments may be differed in other respects, and thus shall not be narrowly confined to what is shown in the figures.

The description uses the phrases "in one embodiment," or "in some embodiments," which may each refer to one or more of the same or different embodiments. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency, e.g., "based on", "more specifically", "in some embodiments", "in one alternative", "in one example", "in one aspect", or etc., in the present disclosure is just one possible example in which would not restrict the specific method. One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, embodiment, or claim described in the present disclosure, "X/Y" may include the meaning of "X or Y". According to any sentence, paragraph, (sub)-bullet, point, action, behavior, term, alternative, aspect, example, embodiment, or claim described in the present disclosure, "X/Y" may also include the meaning of "X and Y". According to any sentence, paragraph, (sub)-bullet, point, action, behavior, term, alternative, aspect, example, embodiment, or claim described in the present disclosure, "X/Y" may also include the meaning of "X and/or Y".

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software embodiment may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example embodiments described in this specification are oriented to software installed and executing on computer hardware, nevertheless, alternative example embodiments implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station (or called a network device) may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using multiple cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5GNR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG)

may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the MAC entity is associated with the MCG or the SCG. Otherwise, the term Special Cell may refer to the PCell. A Special Cell may support a Physical Uplink Control Channel (PUCCH) transmission and contention-based Random Access (CBRA), and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

Some related technologies are introduced first.

In Rel-15 NR, PUSCH repetition type A is supported with the maximum number of PUSCH repetitions of 8, and one repetition is within one slot. A number of PUSCH repetitions is configured by a RRC parameter, and a PUSCH has the number of PUSCH repetitions if the PUSCH transmission is not scheduled by a DCI of DCI format 0_0. In other words, PUSCH transmission during initial access, e.g. message 3 (Msg3), cannot be transmitted with PUSCH repetition. The same symbol allocation is used for each PUSCH repetition in consecutive slots starting from the slot in which the first PUSCH repetition is located. The first PUSCH repetition is located in a slot indicated by a DCI scheduling the PUSCH in case of dynamic grant (DG) PUSCH, or located in a slot configured for the PUSCH in case of configured grant (CG) PUSCH. The last PUSCH repetition is located in the K-th slot from the slot in which the first PUSCH repetition is located, where K is configured by pusch-AggregationFactor for DG PUSCH and configured by repK for CG PUSCH. In Rel-16, the number of repetitions is extended to include 16 by RRC parameter numberOfRepetitions-r16. Redundancy version (RV) mapping for the K PUSCH repetitions is based on a configured RV sequence. Specifically, for the $n^{th}$ PUSCH repetitions among the K PUSCH repetitions, n=1, 2, ..., K, it is associated with (mod(n−1,4)+1)th value in the configured RV sequence. For CG PUSCH, the initial transmission of a transport block may start at the first transmission occasion of the K repetitions if the configured RV sequence is {0,2,3,1}, any of the transmission occasions of the K repetitions that are associated with RV=0 if the configured RV sequence is {0,3,0,3}, any of the transmission occasions of the K repetitions if the configured RV sequence is {0,0,0,0}, except the last transmission occasion when K≥8.

If the TDD configuration configured by tdd-UL-DL-ConfigurationCommon or tdd-UL-DL-ConfigurationDedicated indicates one or more symbols of the symbols allocated for a PUSCH repetition in a slot as DL symbols, or if the one or more symbols of the symbols allocated for a PUSCH repetition in a slot are symbols used for SSB transmission, the PUSCH repetition in the slot is dropped. A symbol indicated by tdd-UL-DL-ConfigurationCommon or tdd-UL-DL-ConfigurationDedicated as a DL symbol, a UL symbol, or a flexible symbol is referred as a semi-DL symbol, a semi-UL symbol, or a semi-flexible symbol, respectively. Therefore, in an unpaired spectrum, the number of actually transmitted PUSCH repetitions may be less than the number of PUSCH repetitions configured by a RRC parameter. As such, the coverage of PUSCH in unpaired spectrum may be limited for some TDD configurations.

PUCCH repetition is supported in Rel-15 NKR. Similarly, a number of PUCCH repetitions is configured by a RRC parameter, i.e. nrofSlots in PUCCH-Config, which may be available after dedicated PUCCH configuration is provided after initial access.

In Rel-15 NR, DCI format 2_0 may be used for dynamically indicating slot formats for a number of slots if UE is configured to monitor DCI format 2_0. DCI format 2_0 is also referred as dynamic slot format indicator (SFI). A semi-flexible symbol may be indicated as a DL symbol or a UL symbol by a dynamic SFI. UE does not expect a semi-flexible symbol in which a DL transmission is scheduled, e.g. a PDSCH, to be indicated as a UL symbol by dynamic SFI. DCI format 2_0 is configured with a monitoring periodicity. A DCI format 2_0 may indicate slot formats for a number of slots which is larger than the number of slots within a monitoring periodicity of DCI format 2_0. UE expects the slot format of a slot indicated by more than one DCI format 2_0 is consistent. UE expects a symbol in which a DL transmission or an UL transmission is scheduled is indicated as a DL symbol or a UL symbol if a dynamic SFI is received later than the DCI scheduling the DL transmission or the UL transmission, respectively.

Inter-slot frequency hopping may be enabled for PUSCH repetitions type A. A list of frequency offsets may be configured by a RRC parameter, and the DCI scheduling a PUSCH transmission may indicate the frequency from the list to apply for the PUSCH transmission. The physical resource blocks (PRBs) used for the first PUSCH repetition in a first slot and for the PUSCH repetitions in even number of slots from the first slot are indicated by the DCI, and the PRBs used for the PUSCH repetitions in odd number of slots from the first slot are the PRBs with the indicated frequency offset from the PRBs indicated by the DCI.

In Rel-15, power control for PUSCH is based on the following formula as specified in 3GPP TS 38.213. If a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i, j, q_d, l)$ in PUSCH transmission occasion i as $$P_{PUSCH,b,f,c}(i, j, q_d, l) =$$

$$\min\begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix}$$

where, $P_{CMAX,f,c}(i)$ is the UE configured maximum output power defined in 3GPP TS 38.101-1, 3GPP TS 38.101-2 and 3GPP TS 38.101-3 for carrier f of serving cell c in PUSCH transmission occasion i.

$$P_{O_{PUSCH},b,f,c}(j) = P_{O_{NOMINAL_{PUSCH}},f,c}(j) + P_{O_{UE_{PUSCH}},f,c}(j),$$

and the values depend on the type of PUSCH transmission, e.g., DG PUSCH or CG PUSCH, since different values may be configured by the different RRC parameters for DG PUSCH and CG PUSCH, and the values depend on sounding reference signal (SRS) resource indicator (SRI), since a list of SRI-PUSCH-PowerControl may be configured and each SRI-PUSCH-PowerControl may indicate a value for $$P_{O_{UE_{PUSCH}},f,c}(j),$$

and the SRI-PUSCH-PowerControl with a SRI-PUSCH-PowerControlID from the list is applied for a DG PUSCH if the SRI in the DCI scheduling the DG PUSCH or applied for a CG PUSCH if the SRI configured in the configuredGrantConfig for the CG PUSCH has the same value as the SRI-PUSCH-PowerControlID.

$\alpha_{b,f,c}(j)$. the values depend on the type of PUSCH transmission, e.g., DG PUSCH or CG PUSCH, since different values may be configured by the different RRC parameters for DG PUSCH and CG PUSCH, and the value depends on sounding reference signal (SRS) resource indicator (SRI), since a list of SRI-PUSCH-PowerControl may be configured and each SRI-PUSCH-PowerControl may indicate a value for $\alpha_{b,f,c}(j)$, and the SRI-PUSCH-PowerControl with a SRI-PUSCH-PowerControlID from the list is applied for a DG PUSCH if the SRI in the DCI scheduling the DG PUSCH or applied for a CG PUSCH if the SRI configured in the configuredGrantConfig for the CG PUSCH has the same value as the SRI-PUSCH-PowerControlID.

$M_{RB,b,f,c}^{PUSCH}(i)$ is the bandwidth of the PUSCH resource assignment expressed in number of resource blocks for PUSCH transmission occasion i on active UL BWP b of carrier f of serving cell c and μ is a SCS configuration.

$PL_{b,f,c}(q_d)$ is a downlink pathloss estimate in dB calculated by the UE using reference signal (RS) index $q_d$ for the active DL BWP b, of carrier f of serving cell c. The value depends on the type of PUSCH transmission, e.g., DG PUSCH or CG PUSCH, since different values may be configured by the different RRC parameters for DG PUSCH and CG PUSCH, and the values depend on sounding reference signal (SRS) resource indicator (SRI), since a list of SRI-PUSCH-PowerControl may be configured and each SRI-PUSCH-PowerControl may indicate a reference resource $q_d$ for measuring $PL_{b,f,c}(q_d)$, and the SRI-PUSCH-PowerControl with a SRI-PUSCH-PowerControlID from the list is applied for a DG PUSCH if the SRI in the DCI scheduling the DG PUSCH or applied for a CG PUSCH if the SRI configured in the configuredGrantConfig for the CG PUSCH has the same value as the SRI-PUSCH-PowerControlID. For type 1 CG, a reference resource $q_d$ for measuring $PL_{b,f,c}(q_d)$ may be directly configured for the CG PUSCH.

$\Delta_{TF,b,f,c}$. The value depends on the transport block size (TBS), resource allocation, number of layers of the PUSCH.

$f_{b,f,c}(i, l)$ is a PUSCH power control adjustment value which may be indicated by a transmit power control (TPC) command or may be indicated TPC commands if UE is configured to accumulate the received TPC commands, where TPC commands may be indicated in DCI scheduling a PUSCH (DCI format 0_0, 0_1) or DCI format 2_2. The value depends on the PUSCH power control adjustment state 1, which depends on sounding reference signal (SRS) resource indicator (SRI) for DG PUSCH, since a list of SRI-PUSCH-PowerControl may be configured and each SRI-PUSCH-PowerControl may indicate a value for 1, and the SRI-PUSCH-PowerControl with a SRI-PUSCH-PowerControlID from the list is applied for a DG PUSCH if the SRI in the DCI scheduling the DG PUSCH has the same value as the SRI-PUSCH-PowerControlID. For CG PUSCH, the PUSCH power control adjustment state 1 is directly configured in configureGrantConfig.

There are some problems in the existing mechanism.

TB Processing Over Multi-Slot PUSCH:

To ensure coverage target can be met for a PUSCH transmission, the PUSCH transmission should be transmitted with a lower coding rate. A TB transmitted over multiple slots and TBS determined based on multiple slots may achieve a lower coding rate than the coding rate achievable when a TB is transmitted over one slot. TBS determination based on multiple slots may need to be defined. When a PUCCH overlaps with a multi-slot PUSCH, UCI multiplexing in the multi-slot PUSCH may need to be defined.

Joint Channel Estimation for Multiple Slots:

Joint channel estimation for multiple slots may achieve better performance than channel estimation for one slot when channel coherence time is longer than the multiple slots over which channel estimation is performed. To enable joint channel estimation for multiple slots, it may need to be ensured that the transmission power over the multiple slots are the same, such that phase continuity can be maintained for the multiple slots.

To enable joint channel estimation for PUSCH repetitions when inter-slot frequency hopping is enabled, frequency hopping should be performed after transmission of multiple slots rather than performed one per slot. In an unpaired spectrum, a PUSCH repetition may be dropped if the symbols containing the PUSCH transmission occasion includes DL symbols or symbols if a synchronization signal block is transmitted in the symbols. Therefore, it is beneficial to define the timing for frequency hopping with consideration of the TDD configuration, such that joint channel estimation may not be affected by PUSCH dropping.

To deal with the aforementioned issues/problems, the following preferred embodiments are proposed.

First Embodiment

TB Processing Over Multi-Slot PUSCH:

The following method may be used for TBS determination for a TB transmitted over multiple slots.

In one embodiment, for the first step (Step 1) in TBS determination procedure as specified in 3GPP TS 38.214, i.e., when (or only when) determining the number of resource elements (RE), the REs in the multiple slots over which a TB is transmitted should be calculated. Specifically, a UE first determines the number of REs allocated for PDSCH within a PRB ($N_{RE}'$) by $N_{RE}'=N_{sc}^{RB} \cdot \Sigma_{i=1}^{L} = N_{sym,l}^{sh} - \Sigma_{i=1}^{L} N_{DMRS,l}^{PRB} - N_{oh}^{PRB} \cdot L$, where $N_{sc}^{RB}=12$ is the number of subcarriers in a physical resource block, $N_{symb,l}^{sh}$ is the number of symbols of the PUSCH allocation within l-th slot of the PUSCH, $N_{DNMRS,l}^{PRB}$ is the number of REs for DM-RS per PRB in the scheduled duration in l-th slot of the PUSCH including the overhead of the DM-RS CDM groups without data, as indicated by DCI format 0_1 or format 0_2 or as described for format 0_0 in Clause 6.2.2 in 3GPP TS 38.214, $N_{oh}^{PRB}$ is the overhead configured by higher layer parameter xOverhead in P USCH-ServingCellConfig, and l=1, . . . , L, where L is the number of allocated slots for the PUSCH. If the xOverhead in PUSCH-Serving- Cellconfig is not configured (a value from 6, 12, or 18), the $N_{oh}^{PRB}$ is set to 0. In one embodiment, a UE determines the total number of REs allocated for PUSCH ($N_{RE}$) by $N_{RE}$=min (156, $N_{RE}'$)·$n_{PRB}$ where $n_{PRB}$ is the total number of allocated PRBs for the UE.

In one embodiment, in Step 2 of the TBS determination procedure, an unquantized intermediate variable ($N^{info}$) is obtained by $N_{info}=N_{RE} \cdot R \cdot Q_m \cdot v$. If (or only if) $N_{info\_o} \leq 3824$, use step 3 as the next step of the TBS determination. Otherwise, use step 4 as the next step of the TBS determination.

In Step 3 of the TBS determination procedure, when (or only when) $N_{inf\_o} \leq 3824$, TBS is determined as follows.

A quantized intermediate number of information bits is $$N'_{info} = \max\left(24, 2^n \cdot \left\lfloor \frac{N_{info}}{2^n} \right\rfloor\right),$$

where n=max(3$\lfloor$ $\log_2(N_{inf\_o})$ $\rfloor$–6).

Use Table (1) to find the closest TBS that is not less than $N_{inf\_o}'$.

TABLE 1

TBS for $N_{inf\_o} \leq 3824$

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |

TABLE 1-continued

TBS for $N_{inf\_o} \leq 3824$

| Index | TBS |
|---|---|
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

In Step 4 of the TBS determination procedure, when (or only when) $N_{inf\_o} > 3824$ TBS is determined as follows.

A quantized intermediate number of information bits is $$N'_{info} = \max\left(3840, 2^n \times \text{round}\left(\frac{N_{info} - 24}{2^n}\right)\right),$$

where n=$\lfloor$ $\log_2(N_{inf\_o}-24)$ $\rfloor$–5 and ties in the round function are broken towards the next largest integer.

if R≤1/4, $$TBS = 8 \cdot C \cdot \left\lceil \frac{N'_{info} + 24}{8 \cdot C} \right\rceil - 24,$$

where $$C = \left\lceil \frac{N'_{info} + 24}{3816} \right\rceil.$$

Otherwise, if $N_{info}'>8424$, $$TBS = 8 \cdot C \cdot \left\lceil \frac{N_{info}' + 24}{8 \cdot C} \right\rceil - 24,$$

where $$C = \left\lceil \frac{N_{info}' + 24}{8424} \right\rceil;$$

otherwise, $$TBS = 8 \cdot \left\lceil \frac{N_{info}' + 24}{8} \right\rceil - 24.$$

In one embodiment, a scaling factor S may be applied in Step 2 of the TBS determination procedure. That is, $N_{info}=N_{RE} \cdot R \cdot Q_m \cdot S$. The scaling factor may be configured by a RRC parameter or may be indicated by DCI. In one embodiment, a list of scaling factors may be predefined or configured by a RRC parameter and the DCI scheduling the multi-slot PUSCH may indicate a value from the predefined or configured list of scaling factors. In one embodiment, scaling factors may be configured in one or more PUSCH-TimeDomainResourceAllocation in PUSCH-TimeDomain-ResourceAllocationList, and the scaling factor in the PUSCH-TimeDomainResourceAllocation indicated by time domain resource allocation field in the DCI scheduling the multi-slot PUSCH.

In one embodiment, the time domain resource allocation for each slot of the multiple slots of the PUSCH may be indicated by a separate start and length indicator (SLIV). In other words, a row in a time domain resource allocation table configured by PUSCH-TimeDomainResourceAllocationList may include multiple SLIVs, each indicating a time domain resource allocation in a slot.

Second Embodiment

The following method may be used for UCI multiplexing in a multi-slot PUSCH when a PUCCH overlaps with the multi-slot PUSCH.

In one embodiment, when (or only when) UCI multiplexing timeline is satisfied between the end of the DCI scheduling the PUSCH and the start of the multi-slot PUSCH and the PUCCH, between the end of the corresponding PDSCH for the PUCCH and the start of the multi-slot PUSCH and the PUCCH, and between the end of the DCI scheduling the PUCCH and the start of the multi-slot PUSCH and the PUCCH, the PUCCH is multiplexed in the multi-slot PUSCH. In one embodiment, a different UCI-OnPUSCH, e.g. UCI-OnPUSCHMultiSlot, including beta offsets and scaling factor, may be configured for multiplexing a PUCCH in a multi-slot PUSCH. In one embodiment, the beta_offset indicator field in DCI format 0_1 or DCI format 0_2 indicates a beta offset in UCI-OnPUSCHMultiSlot if the DCI format 0_1 or DCI format 0_2 schedules a multi-slot PUSCH. In one embodiment, the UCI of the PUCCH is multiplexed in the slot in which the PUCCH overlaps with the multi-slot PUSCH. The multi-slot PUSCH is dropped if (or only if) the UCI multiplexing timeline is not satisfied.

In one embodiment, UCI multiplexing timeline is expected to be satisfied between the end of the DCI scheduling the PUSCH and the start of the PUSCH transmission in the slot overlapping with the PUCCH and the start of the PUCCH, between the end of the corresponding PDSCH for the PUCCH and the start of the PUSCH transmission in the slot overlapping with the PUCCH and the start of the PUCCH, and between the end of the DCI scheduling the PUCCH and the start of the PUSCH transmission in the slot overlapping with the PUCCH and the start of the PUCCH, and UCI of the PUCCH is multiplexed in the slot in which the PUCCH overlaps with the multi-slot PUSCH.

In one embodiment, UCI of the PUCCH is multiplexed in slots starting from the first slot of the multi-slot PUSCH and until the slot in which the number of REs for the UCI determined based on Clause 6.3.2.4 in 3GPP TS 38.212 are completely multiplexed. In one embodiment, UCI of the PUCCH is multiplexed in slots starting from the slot in which the multi-slot PUSCH overlaps with the PUCCH and until the slot in which the number of REs for the UCI determined based on Clause 6.3.2.4 in 3GPP TS 38.212 are completely multiplexed. In one embodiment, the upper limit of the number of resource elements used for multiplexing UCI is calculated based on the scaling factor and the number of resource elements that may be used for multiplexing UCI in all slots of the multi-slot PUSCH. Specifically, $$\left\lceil \alpha \cdot \sum_{l=l_0}^{N_{symb,all\ slots}^{PUSCH}-1} M_{sc}^{UCI}(l) \right\rceil$$

is calculated as the upper limit, where l is the symbol index of the symbols in the multi-slot PUSCH, and $N_{symb,all\ slots}^{PUSCH}$ are the total number of symbols of the multi-slot PUSCH. In one embodiment, the upper limit of the number of resource elements used for multiplexing UCI in a slot of the multi-slot PUSCH is calculated based on the scaling factor and the number of resource elements that may be used for multiplexing UCI in the slot of the multi-slot PUSCH.

In one embodiment, the encoded HARQ-ACK bits may be mapped to a configured or predefined number of symbols after the front loaded DMRS in each slot of the multi-slot PUSCH until the slot in which the HARQ-ACK bits are completely multiplexed. In one embodiment, the encoded HARQ-ACK bits may be mapped to a configured or predefined number of symbols after the front loaded DMRS in the first slot of the multi-slot PUSCH, and mapped to a configured or predefined number of symbols before and after the front loaded DMRS in other slots of the multi-slot PUSCH until the slot in which the HARQ-ACK bits are completely multiplexed, if (or only if) joint channel estimation are enabled as in following embodiments.

In one embodiment, the encoded HARQ-ACK bits may be mapped to a configured or predefined number of symbols after the front loaded DMRS in the first slot of the multi-slot PUSCH, if (or only if) the first slot of the multi-slot PUSCH is the first slot in which HARQ-ACK bits are multiplexed, and mapped to a configured or predefined number of symbols before and after the front loaded DMRS in slots of the multi-slot PUSCH until the slot in which the HARQ-ACK bits are completely multiplexed, if (or only if) joint channel estimation are enabled as in following embodiments.

In one embodiment, when (or only when) a multi-slot PUSCH overlaps in multiple slots with a PUCCH with PUCCH repetitions, the PUCCH is multiplexed in the multiple slots in which the multi-slot PUSCH overlaps with the PUCCH. UE may expect the multiplexing timeline to be satisfied between the end of the DCI scheduling the PUSCH and the start of the PUSCH transmission and the start of the PUCCH transmission in a slot the PUSCH and the PUCCH overlap, between the end of the corresponding PDSCH for the PUCCH and the start of the PUSCH transmission and the start of the PUCCH transmission in a slot the PUSCH and the PUCCH overlap, and between the end of the DCI scheduling the PUCCH and the start of the PUSCH transmission and the start of the PUCCH in a slot the PUSCH and the PUCCH overlap.

Third Embodiment

Figure 1:
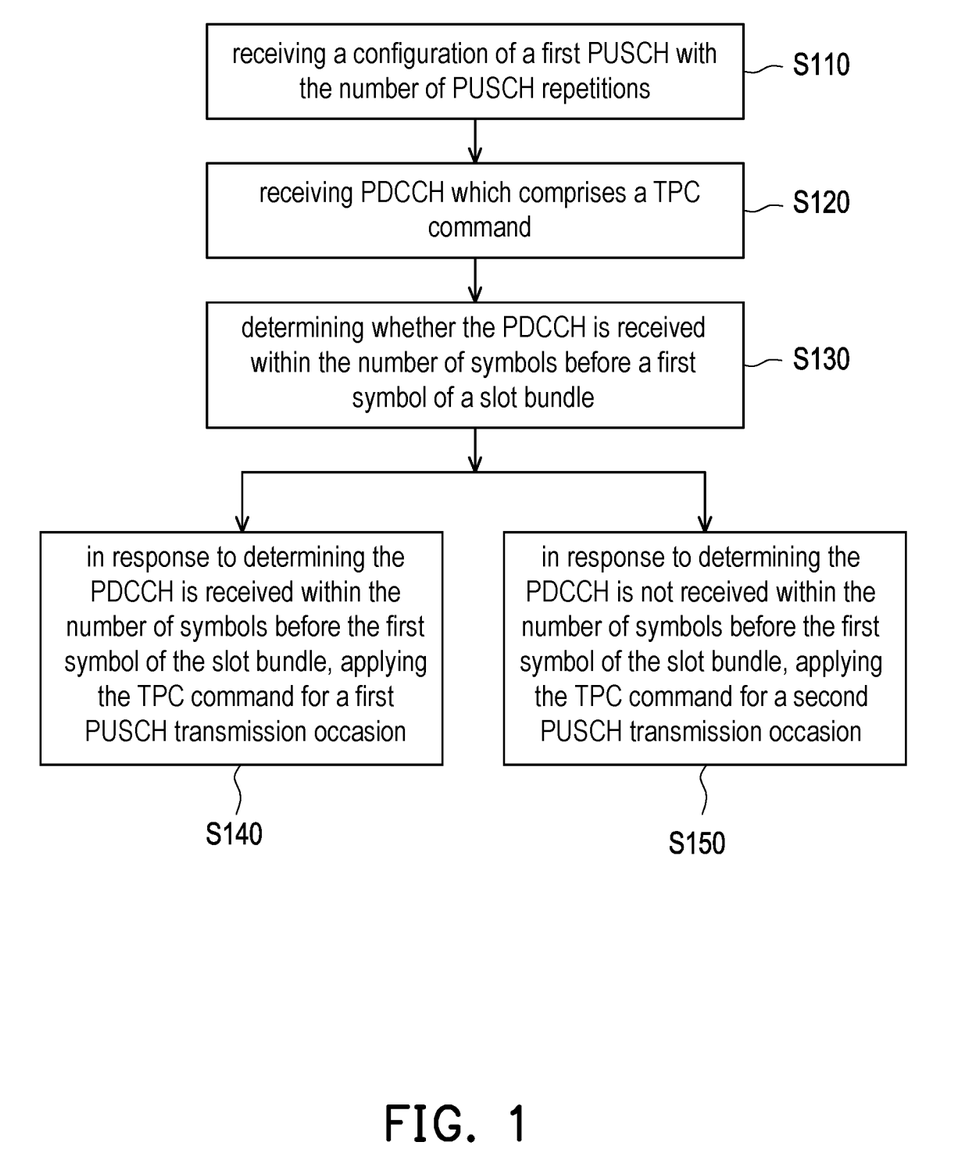
FIG. 1 is a flow chart that illustrates a method adapted for UE according to one of the exemplary embodiments of the disclosure.

Joint Channel Estimation for Multiple Slots:

FIG. 1 is a flow chart that illustrates a method adapted for UE according to one of the exemplary embodiments of the disclosure. Referring to FIG. 1, a configuration of a first PUSCH with a number of PUSCH repetitions is received from a network device (step S110). Physical Downlink Control Channel (PDCCH) which includes a Transmit Power Control (TPC) command is received from the network device (step S120). Whether the PDCCH is received within a number of symbols before a first symbol of a slot bundle is determined (step S130). The first symbol is an initial symbol in the slot bundle, and the slot bundle includes multiple time slots used for transmitting the first PUSCH with the number of the PUSCH repetitions. In response to determining the PDCCH is received within the number of symbols before the first symbol of the slot bundle, the TPC command is applied for a first PUSCH transmission occasion (step S140). In response to determining the PDCCH is not received within the number of symbols before the first symbol of the slot bundle, the TPC command is applied for a second PUSCH transmission occasion (step S150). The first PUSCH transmission occasion is within the slot bundle. The second PUSCH transmission occasion is within a second slot bundle after the slot bundle.

In one embodiment, a slot bundle which defines a number of (time) slots over which joint channel estimation is performed is configured by a RRC parameter, e.g. slotBundle, in PUSCH-Config or other IE.

In one embodiment, the start of a slot bundle may be the start of a PUSCH transmission or may start at a (time) slot with a specific slot index. In one embodiment, the slot index may be derived based on a configured periodicity and based on a specific reference system frame number (SFN).

Figure 2:
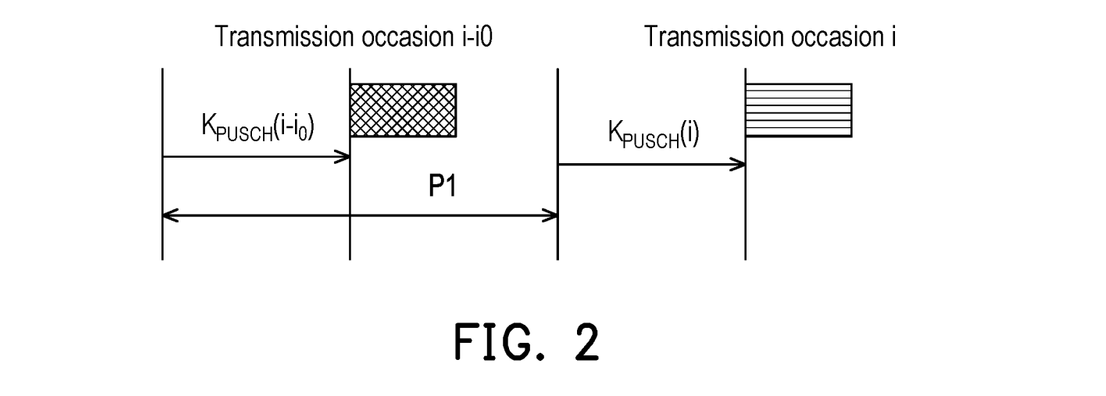
FIG. 2 is a schematic diagram that illustrates TPC command reception occasion without slot bundle according to one of the exemplary embodiments of the disclosure.

FIG. 2 is a schematic diagram that illustrates TPC command reception occasion without slot bundle according to one of the exemplary embodiments of the disclosure. Referring to FIG. 2, PUSCH transmission power for PUSCH transmission occasions is based on the TPC command accumulated until PUSCH transmission occasion i, if an accumulation of TPC command is configured. Specifically, $$\sum_{m=0}^{C(D_i)-1} \delta_{PUSCH,b,f,c}(m, l)$$

in 3GPP TS 38.213 is a sum of TPC command values in a set $D_i$ of TPC command values with cardinality $\mathcal{C}$ ($D_i$) that the UE receives between $K_{PUSCH}$ (i–i_0)–1 symbols before PUSCH transmission occasion i–i_0 and $K_{PUSCH}$(i) symbols before the PUSCH transmission occasion i on active UL BWP b of carrier f of serving cell c for PUSCH power control adjustment state l, where $i_0>0$ is the smallest integer for which $K_{PUSCH}$ (i–i_0) symbols before the PUSCH transmission occasion i–i_0 is earlier than $K_{PUSCH}$(i) symbols before the first PUSCH transmission occasion i. For example, when UE receives a TPC command within the period P1, the TPC command is not applied to the PUSCH transmission occasion i–i_0 but is applied to the PUSCH transmission occasion i. If a PUSCH transmission is scheduled by a DCI format, $K_{PUSCH}$ (i) is a number of symbols for active UL BWP b of carrier f of serving cell c after a last symbol of a corresponding PDCCH reception and before a first/initial symbol of the PUSCH transmission.

Figure 3:
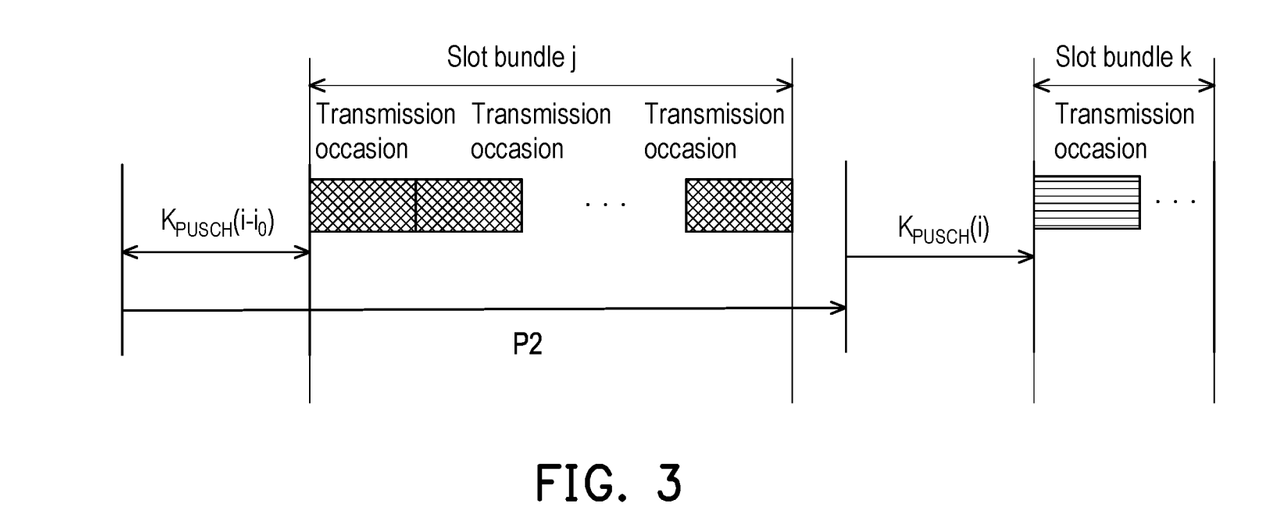
FIG. 3 is a schematic diagram that illustrates TPC command reception occasion with slot bundle according to one of the exemplary embodiments of the disclosure.

In one embodiment, PUSCH transmission power for PUSCH transmission occasions in a slot bundle is based on the TPC command accumulated until the first PUSCH transmission occasion in the slot bundle, if (or only if) an accumulation of TPC command is configured. FIG. 3 is a schematic diagram that illustrates TPC command reception occasion with slot bundle according to one of the exemplary embodiments of the disclosure. Referring to FIG. 3, $$\sum_{m=0}^{C(D_i)-1} \delta_{PUSCH,b,f,c}(m, l)$$

in 3GPP TS 38.213 is a sum of TPC command values in a set $D_i$ of TPC command values with cardinality that the UE receives between $K_{PUSCH}$ (i–i^0)–1 symbols before the first PUSCH transmission occasion (e.g., PUSCH transmission occasion i–i_0) in slot bundle j and $K_{PUSCH}$ (i) symbols before the first PUSCH transmission occasion (e.g., PUSCH transmission occasion i), for example, the period P2, in slot bundle k on active UL BWP b of carrier f of serving cell c for PUSCH power control adjustment state l, where $i_0>0$ is the smallest integer for which $K_{PUSCH}$ (i–i_0) symbols before the first/initial PUSCH transmission occasion in slot bundle j is earlier than $K_{PUSCH}$(i) symbols before the first/initial PUSCH transmission occasion in slot bundle k.

For example, when UE receives a TPC command between $K_{PUSCH}$ (i–i_0)–1 symbols before the first PUSCH transmission occasion (e.g., PUSCH transmission occasion i–i_0) in slot bundle j and $K_{PUSCH}$ (i) symbols before the first PUSCH transmission occasion (e.g., PUSCH transmission occasion i) in slot bundle j+1, if the TPC command is received before $K_{PUSCH}$(i') symbols before a PUSCH transmission occasion i', where the PUSCH transmission occasion i' is within slot bundle j, the TPC command is not applied to the PUSCH transmission occasion i'. In other words, the TPC command that should be applied for a PUSCH occasion based on the existing timeline condition is not applied for the PUSCH occasion if the PUSCH occasion is within a slot bundle, and the TPC command is applied to another slot bundle after the (current) slot bundle. That is, the TPC command is applied for a PUSCH occasion within the next slot bundle. In other words, the TPC command is not in the set $D_{i'}$ for the PUSCH transmission occasion i'.

In one embodiment, if (or only if) a PUSCH transmission i is scheduled by a DCI format, $K_{PUSCH}$ (i) is a number of symbols for active UL BWP b of carrier of serving cell c after a last symbol of a corresponding PDCCH reception and before a first/initial symbol of the PUSCH transmission. In one embodiment, if (or only if) a PUSCH transmission i is configured by ConfiguredGrantConfig, $K_{PUSCH}$(i) is a number of $K_{PUSCH,min}$ symbols equal to the product of a number of symbols per slot, $N_{symb}^{slot}$, and the minimum of the values provided by k2 in PUSCH-ConfgCommon for active UL BWP b of carrier of serving cell c. It is noted that PUSCH transmissions within a slot bundle may or may not be PUSCH repetitions of the same PUSCH. In case more than one PUSCHs scheduled by DCIs are within a slot bundle, a network device (e.g., gNB) may need to allocate the same TBS, number of layers, resource allocation, and SRI for the more than one PUSCHs.

Further, in one embodiment, PUSCHs scheduled by DCIs within a slot bundle, other than the first one PUSCH scheduled by a first DCI among the DCIs, may need to have a TPC command field indicating zero transmission power change. In case more than one PUSCHs including at least one CG PUSCH are within a slot bundle, a network device (e.g., gNB) may need to allocate the P0, alpha, q_d, TBS, number of layers, resource allocation, and SRI for the more than one PUSCHs. It is noted that all PUSCH repetitions of a PUSCH transmission may cross more than one slot bundle. The network device (e.g., gNB) may perform joint channel estimation for the PUSCH repetitions within a slot bundle.

In one embodiment, for DG PUSCH, when (or only when) all PUSCH repetitions of a PUSCH transmission cross more than one slot bundle, an accumulation of TPC command is configured until the slot bundle containing the first PUSCH repetition of the PUSCH. In other words, the same transmission power (e.g., TPC command) is applied for all PUSCH repetitions of a PUSCH.

In one embodiment, all PUSCH repetitions of a PUSCH may be defined as a slot bundle.

In one embodiment, the start of a slot bundle may be the start of a PUSCH transmission or may start at a slot with a specific slot index. In one embodiment, the slot index may be derived based on a configured periodicity and based on a specific reference system frame number (SFN). In one embodiment, PUSCH transmission power is evaluated for the PUSCHs in a slot bundle, and a maximum evaluated PUSCH transmission power of the PUSCHs is taken as the PUSCH transmission power for the PUSCHs in the slot bundle.

In one embodiment, for PUSCH with PUSCH repetitions, a slot bundle starts in a slot in which a first PUSCH repetition is transmitted for a PUSCH. In one embodiment, if (or only if) PUSCH repetitions within a slot bundle is not transmitted more than a configured or predefined duration due to PUSCH transmission occasion colliding with DL symbols or symbols containing SSBs (e.g., more than a number of consecutive symbols or a number of consecutive symbols which depends on UE capability), frequency hopping is performed in the next slot in which a PUSCH repetition is transmitted, and the next slot bundle (e.g., the second slot bundle) starts in the slot.

In one embodiment, UE may receive a configuration of a first length of the slot bundle. The first length is the number of time slots in the slot bundle, and the value of the first length is N. The UE may initiate the slot bundle at a first slot in which the first PUSCH with the number of PUSCH repetitions initiates. The slot bundle ends at a second slot which is a N-th slot counted from the first slot. For example, the length of the slot bundle is 5 timeslots. If a first PUSCH initiates at the first timeslot, the slot bundle would be ended at the fifth timeslot.

In one embodiment, UE may receive a configuration of a second length of the second slot bundle. The second length is the number of time slots in the second slot bundle, and the value of the second length is N2. The UE may initiate the second slot bundle at a third slot which is the next slot of the second slot when (or only when) the number of PUSCH repetitions of the first PUSCH is larger than N2. The second PUSCH transmission occasion is used for transmitting the first PUSCH. For example, if the length of the second slot bundle is 5 and the number of PUSCH repetitions is 6, UE would initiate the second slot bundle for transmitting the first PUSCH as in the slot bundle.

In one embodiment, UE may receive a configuration of a second length of the second slot bundle. The second length is the number of time slots in the second slot bundle, and the value of the second length is N3. The UE may initiate the second slot bundle at a fourth slot in which a second PUSCH (different from the first PUSCH) initiates when (or only when) the number of PUSCH repetitions of the first PUSCH is not larger than N3. The second PUSCH transmission occasion is used for transmitting the second PUSCH. For example, if the length of the second slot bundle is 6 and the number of PUSCH repetitions is 3, UE would initiate the second slot bundle for transmitting the second PUSCH different from the first PUSCH in the previous slot bundle.

In one embodiment, the configuration of a first PUSCH with the number of PUSCH repetitions is received in a RRC message.

In one embodiment, the configuration of the first length of the slot bundle is received in an RRC message. In one embodiment, the configuration of the second length of the second slot bundle is received in an RRC message.

In some embodiments, the above embodiments may also be applicable for PUCCH with PUCCH repetitions.

Figure 4:
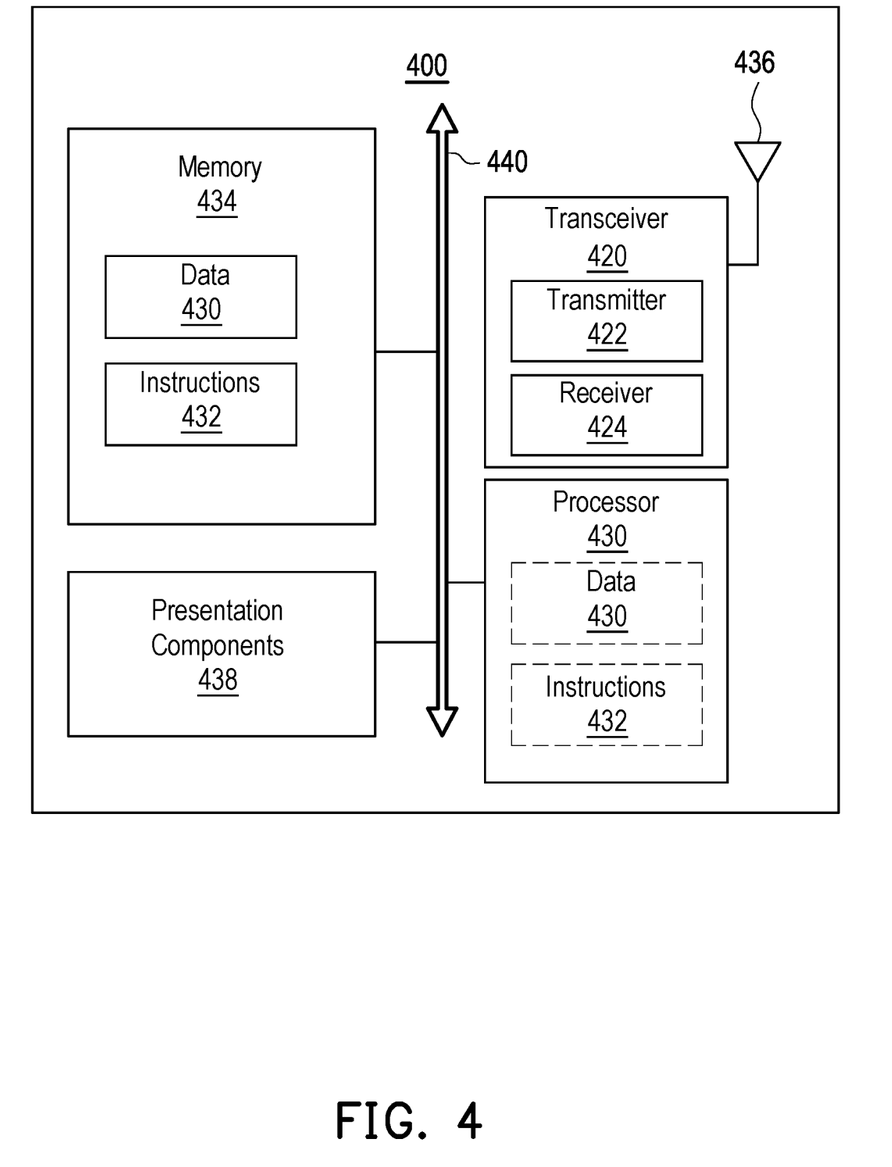
FIG. 4 is a block diagram illustrating a node for wireless communication, according to an example embodiment of the present disclosure.

FIG. 4 illustrates a block diagram of a node for wireless communication, in accordance with various aspects of the present application. As shown in FIG. 4, a node 400 may include a transceiver 420, a processor 428, a memory 434, one or more presentation components 438, and at least one antenna 436. The node 400 may also include an RF spectrum band module, a base station communications module, a network communications module, and a system communications management module, Input/Output (I/O) ports, I/O components, and power supply (not explicitly shown in FIG. 4). Each of these components may be in communication with each other, directly or indirectly, over one or more buses 440. In one embodiment, the node 400 may be a UE or a base station (or called a network device) that performs various functions described herein, for example, with reference to FIGS. 1 to 3.

The transceiver 420 having a transmitter 422 (e.g., transmitting/transmission circuitry) and a receiver 424 (e.g., receiving/reception circuitry) may be configured to transmit and/or receive time and/or frequency resource partitioning information. In some embodiments, the transceiver 420 may be configured to transmit in different types of subframes and slots including, but not limited to, usable, non-usable and flexibly usable subframes and slot formats. The transceiver 420 may be configured to receive data and control channels.

The node 400 may include a variety of computer-readable media. Computer-readable media can be any available media that can be accessed by the node 400 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 434 may include computer-storage media in the form of volatile and/or non-volatile memory. The memory 434 may be removable, non-removable, or a combination thereof. Exemplary memory includes solid-state memory, hard drives, optical-disc drives, and etc. As illustrated in FIG. 4, The memory 434 may store computer-readable, computer-executable instructions 432 (e.g., software codes) that are configured to, when executed, cause the processor 428 to perform various functions described herein, for example, with reference to FIGS. 1 to 3. Alternatively, the instructions 432 may not be directly executable by the processor 428 but be configured to cause the node 400 (e.g., when compiled and executed) to perform various functions described herein.

The processor 428 (e.g., having processing circuitry) may include an intelligent hardware device, e.g., a Central Processing Unit (CPU), a microcontroller, an ASIC, and etc. The processor 428 may include memory. The processor 428 may process the data 430 and the instructions 432 received from the memory 434, and information through the transceiver 420, the base band communications module, and/or the network communications module. The processor 428 may also process information to be sent to the transceiver 420 for transmission through the antenna 436, to the network communications module for transmission to a core network.

One or more presentation components 438 presents data indications to a person or other device. Exemplary presentation components 438 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain embodiments, a person of ordinary skill in the art would recognize that changes may be made in form and detail without departing from the scope of those concepts. As such, the described embodiments are to be considered in all respects as illustrative and not restrictive. It should also be understood that the present application is not limited to the particular embodiments described above, but many rearrangements, modifications, and substitutions are possible without departing from the scope of the present disclosure

What is claimed is:

1. A method for transmitting Physical Uplink Shared Channel (PUSCH), adapted for a user equipment (UE), the method comprising:
   receiving a configuration of a first PUSCH with a number of PUSCH repetitions;
   receiving Physical Downlink Control Channel (PDCCH) which comprises a Transmit Power Control (TPC) command;
   determining whether the PDCCH is received within a number of symbols before a first symbol of a slot bundle, wherein the first symbol is an initial symbol in the slot bundle, and the slot bundle comprises a plurality of time slots used for transmitting the first PUSCH with the number of the PUSCH repetitions;
   in response to determining the PDCCH is received within the number of symbols before the first symbol of the slot bundle, applying the TPC command for a first PUSCH transmission occasion; and
   in response to determining the PDCCH is not received within the number of symbols before the first symbol of the slot bundle, applying the TPC command for a second PUSCH transmission occasion, wherein
   the first PUSCH transmission occasion is within the slot bundle, and
   the second PUSCH transmission occasion is within a second slot bundle after the slot bundle.

2. The method of claim 1, further comprising:
   receiving a configuration of a first length of the slot bundle, wherein the first length is a number of time slots in the slot bundle, and a value of the first length is N; and
   initiating the slot bundle at a first slot in which the first PUSCH with the number of PUSCH repetitions initiates, wherein
   the slot bundle ends at a second slot which is a N-th slot counted from the first slot.

3. The method of claim 2, further comprising:
   receiving a configuration of a second length of the second slot bundle, wherein the second length is a number of time slots in the second slot bundle, and a value of the second length is N; and
   initiating the second slot bundle at a third slot which is a next slot of the second slot in response to the number of PUSCH repetitions of the first PUSCH being larger than N, wherein
   the second PUSCH transmission occasion is used for transmitting the first PUSCH.

4. The method of claim 2, further comprising:
   receiving a configuration of a second length of the second slot bundle, wherein the second length is a number of time slots in the second slot bundle, and a value of the second length is N; and
   initiating the second slot bundle at a fourth slot in which a second PUSCH initiates in response to the number of PUSCH repetitions of the first PUSCH not larger than N, wherein
   the second PUSCH transmission occasion is used for transmitting the second PUSCH.

5. The method of claim 1, wherein the configuration of a first PUSCH with the number of PUSCH repetitions is received in a Radio Resource Control (RRC) message.

6. The method of claim 1, wherein the configuration of the first length of the slot bundle is received in an RRC message.

7. A user equipment (UE), comprising:
   a transceiver, used for transmitting or receiving signals;
   a memory, used for storing a program code; and
   a processor, coupled to the transceiver and the memory, and configured to load and execute the program code to perform:
      receiving, through the transceiver, a configuration of a first Physical Uplink Shared Channel (PUSCH) with a number of PUSCH repetitions;
      receiving, through the transceiver, Physical Downlink Control Channel (PDCCH) which comprises a Transmit Power Control (TPC) command;

determining whether the PDCCH is received within a number of symbols before a first symbol of a slot bundle, wherein the first symbol is an initial symbol in the slot bundle, and the slot bundle comprises a plurality of time slots used for transmitting the first PUSCH with the number of the PUSCH repetitions;

in response to determining the PDCCH is received within the number of symbols before the first symbol of the slot bundle, applying the TPC command for a first PUSCH transmission occasion; and in response to determining the PDCCH is not received within the number of symbols before the first symbol of the slot bundle, applying the TPC for a second PUSCH transmission occasion, wherein the first PUSCH transmission occasion is within the slot bundle, and the second PUSCH transmission occasion is within a second slot bundle after the slot bundle.

8. The UE of claim 7, wherein the processor is further configured for:

receiving, through the transceiver, a configuration of a first length of the slot bundle, wherein the first length is a number of time slots in the slot bundle, and a value of the first length is N; and initiating the slot bundle at a first slot in which the first PUSCH with the number of PUSCH repetitions initiates, wherein the slot bundle ends at a second slot which is a N-th slot counted from the first slot.

9. The UE of claim 8, wherein the processor is further configured for:

receiving, through the transceiver, a configuration of a second length of the second slot bundle, wherein the second length is a number of time slots in the second slot bundle, and a value of the second length is N; and initiating the second slot bundle at a third slot which is a next slot of the second slot in response to the number of PUSCH repetitions of the first PUSCH being larger than N, wherein the second PUSCH transmission occasion is used for transmitting the first PUSCH.

10. The UE of claim 8, wherein the processor is further configured for:

receiving, through the transceiver, a configuration of a second length of the second slot bundle, wherein the second length is a number of time slots in the second slot bundle, and a value of the second length is N; and initiating the second slot bundle at a fourth slot in which a second PUSCH initiates in response to the number of PUSCH repetitions of the first PUSCH not larger than N, wherein the second PUSCH transmission occasion is used for transmitting the second PUSCH.

11. The UE of claim 7, wherein the configuration of a first PUSCH with the number of PUSCH repetitions is received in a Radio Resource Control (RRC) message.

12. The UE of claim 8, wherein the configuration of the first length of the slot bundle is received in an RRC message.

* * * * *